United States Patent
Mayorga et al.

(10) Patent No.: US 10,578,225 B1
(45) Date of Patent: Mar. 3, 2020

(54) AUTOMATED GRAY WATER SYSTEM

(71) Applicants: Anthony Mayorga, Los Angeles, CA (US); Ronald Hernandez, Los Angelex, CA (US)

(72) Inventors: Anthony Mayorga, Los Angeles, CA (US); Ronald Hernandez, Los Angelex, CA (US)

(*) Notice: Subject to any disclaimer, the term of this patent is extended or adjusted under 35 U.S.C. 154(b) by 18 days.

(21) Appl. No.: 15/906,151

(22) Filed: Feb. 27, 2018

(51) Int. Cl.
E03C 1/12 (2006.01)
F16K 31/02 (2006.01)
F16K 11/076 (2006.01)
E03F 7/02 (2006.01)
A01G 25/00 (2006.01)

(52) U.S. Cl.
CPC .......... *F16K 31/02* (2013.01); *E03C 1/12* (2013.01); *E03F 7/02* (2013.01); *F16K 11/076* (2013.01); *A01G 25/00* (2013.01)

(58) Field of Classification Search
CPC ...... E03B 1/04; E03B 1/044; E03B 2001/045; E03B 2001/047; E03C 1/12; E03F 7/02; F16K 11/076; F16K 31/02; A01G 25/00
See application file for complete search history.

(56) References Cited

U.S. PATENT DOCUMENTS

| | | | |
|---|---|---|---|
| 4,162,218 A * | 7/1979 | McCormick | C02F 1/006 210/104 |
| 4,797,645 A * | 1/1989 | Uetsuhara | H01F 7/1646 335/230 |
| 5,052,174 A * | 10/1991 | Bak | F02C 9/263 251/129.05 |
| 5,192,426 A | 3/1993 | DeCoster | |
| 5,971,303 A * | 10/1999 | Pugh-Gottlieb | E03B 1/044 241/46.013 |
| 6,132,138 A * | 10/2000 | Haese | A01N 25/00 405/37 |
| 6,299,775 B1 | 10/2001 | Elston | |
| 6,355,160 B1 | 3/2002 | Wiseman | |
| 6,702,942 B1 | 3/2004 | Nield | |
| 8,377,291 B2 | 2/2013 | Eckman | |
| D740,915 S | 10/2015 | Harrington | |
| 9,404,241 B1 * | 8/2016 | Davantes | E03B 1/044 |
| 10,132,083 B1 * | 11/2018 | Casey | C02F 1/003 |
| 2012/0060932 A1 * | 3/2012 | Gutierrez-Wolf | E03B 1/044 137/2 |

(Continued)

FOREIGN PATENT DOCUMENTS

WO 2010124037 10/2010

*Primary Examiner* — Kevin F Murphy
*Assistant Examiner* — Jonathan J Waddy

(57) ABSTRACT

The automated gray water system comprises a three port diverter valve and a wireless switch controller. The three port diverter diverts gray water collected within a building from a first port to a second port when an internal mechanism of the valve is in a first valve position and from the first port to a third port when the internal mechanism of the value is in a second valve position. In the first valve position, gray water is passed to a water purification and/or storage system and may be used as a non-potable resource. As a non-limiting example, the gray water may be used for landscape irrigation. In the second valve position, the gray water is passed to a public sewer system or septic system. The position of the valve may be controlled from a smart device via a wireless link to the wireless switch controller.

1 Claim, 2 Drawing Sheets

(56) References Cited

U.S. PATENT DOCUMENTS

| | | |
|---|---|---|
| 2012/0199220 A1 | 8/2012 | Knepp |
| 2013/0048083 A1* | 2/2013 | Sato ........................ E03B 1/044 137/1 |
| 2016/0023217 A1* | 1/2016 | Cornille .............. B02C 18/0092 137/2 |

* cited by examiner

AUTOMATED GRAY WATER SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of water conservation, more specifically, an automated gray water system.

SUMMARY OF INVENTION

The automated gray water system comprises a three port diverter valve and a wireless switch controller. The three port diverter diverts gray water collected within a building from a first port to a second port when an internal mechanism of the valve is in a first valve position and from the first port to a third port when the internal mechanism of the value is in a second valve position. In the first valve position, gray water is passed to a water purification and/or storage system and may be used as a non-potable resource. As a non-limiting example, the gray water may be used for landscape irrigation. In the second valve position, the gray water is passed to a public sewer system or septic system. The position of the valve may be controlled from a smart device via a wireless link to the wireless switch controller.

An object of the invention is to control the path of gray water drainage within a building.

Another object of the invention is to sometimes divert gray water to a water conservation system.

A further object of the invention is to sometimes divert gray water to a sewer or septic system.

Yet another object of the invention is to control the path of gray water drainage remotely using a smart device and a wireless connection.

These together with additional objects, features and advantages of the automated gray water system will be readily apparent to those of ordinary skill in the art upon reading the following detailed description of the presently preferred, but nonetheless illustrative, embodiments when taken in conjunction with the accompanying drawings.

In this respect, before explaining the current embodiments of the automated gray water system in detail, it is to be understood that the automated gray water system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated gray water system.

It is therefore important that the claims be regarded as including such equivalent construction insofar as they do not depart from the spirit and scope of the automated gray water system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
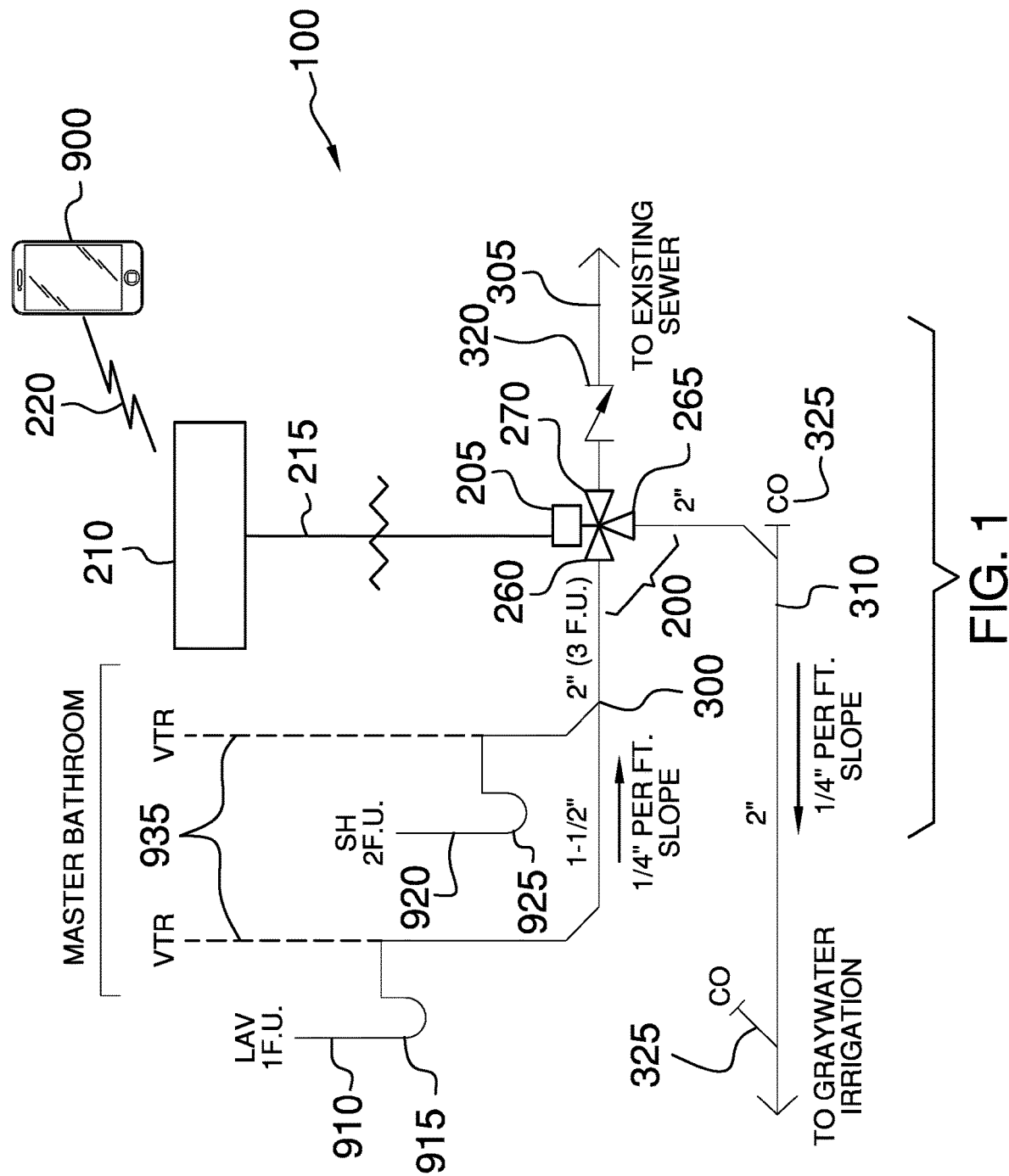
FIG. 1 is a block diagram of an embodiment of the disclosure.
Figure 2:
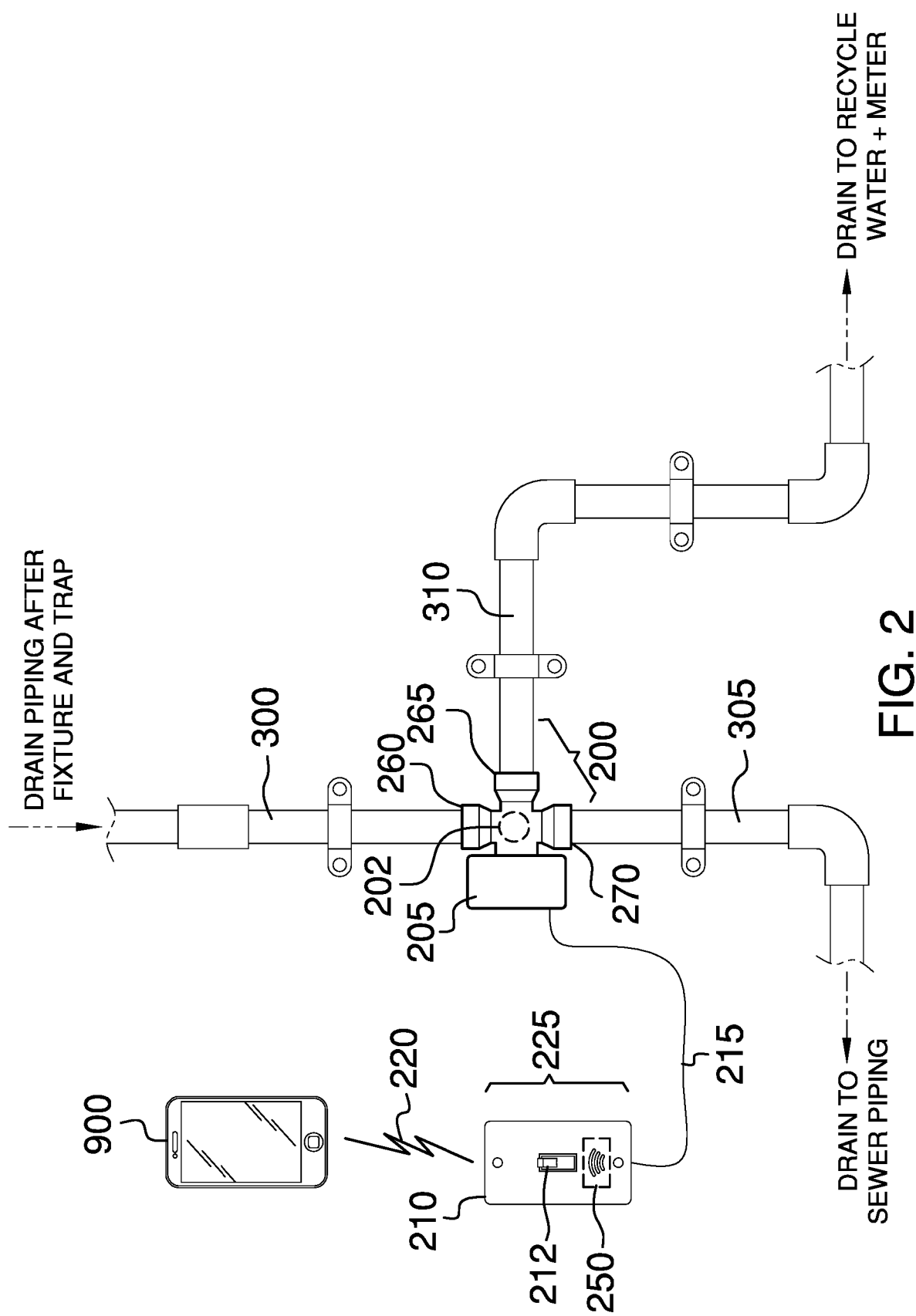
FIG. 2 is a detail view of an embodiment of the disclosure.

Detailed reference will now be made to a first potential embodiment of the disclosure, which is illustrated in FIGS. 1 through 2.

The automated gray water system 100 (hereinafter invention) comprises a three port diverter valve 200, a valve controller 205, and a wireless switch controller 210. The invention 100 is a diverter valve that may divert gray water arriving via a gray water collection drain pipe 300 into a recycling system drain pipe 310 or into a sewer drain pipe 305. The diverter valve may be controlled by a wall switch 225 or by a smart device 900 via a wireless link 220.

The three port diverter valve 200 comprises a first port 260, a second port 265, and a third port 270. A ball, a shuttle, or other internal mechanism of the valve 202 diverts the gray water from the first port 260 to the second port 265 when the internal mechanism of the valve 202 is in a first valve position or from the first port 260 to the third port 270 when the internal mechanism of the valve 202 is in a second valve position.

The internal mechanism of the valve 202 may be repositioned by action of the valve controller 205.

The valve controller 205 may be mounted onto the three port diverter valve 200 such that an actuator (not illustrated in the figures) of the valve controller 205 is coupled to the internal mechanism of the valve 202. The valve controller 205 may utilize a solenoid, motor, or other electromechanical device that changes position in response to the application of an electrical potential. The actuator may move in a linear or rotary manner when energized by the electrical potential. The linear or rotary motion may change the position of the internal mechanism of the valve 202 to which the actuator is attached.

The wireless switch controller 210 may be an electrical device that controls the application of the electrical potential to the valve controller 205. The wireless switch controller 210 may be electrically coupled to the valve controller 205 via a switch wiring 215. The wireless switch controller 210 may have an on state and an off state.

The wireless switch controller 210 may have the form factor and appearance of the wall switch 225. The wireless switch controller 210 may transition between the on state and the off state based upon a physical movement of a switch handle 212.

The wireless switch controller 210 may comprise a transceiver 250. The wireless switch controller 210 may communicate with an application program (not illustrated in the figures) running on the smart device 900 via the transceiver 250. The application program may provide a user interface (not illustrated in the figures) that is adapted to allow a user (not illustrated in the figures) of the smart device 900 to monitor and control the wireless switch controller 210.

The wireless switch controller 210 may transition between the on state and the off state based upon wireless messages exchanged via the wireless link 220 between the wireless switch controller 210 and the smart device 900.

In some embodiments, the wireless switch controller 210 may pass the electrical potential when in the on state and may block the flow of the electrical potential when in the off state. The application of the electrical potential to the valve controller 205 when the wireless switch controller 210 is in the on state may cause the valve controller 205 to move the internal mechanism of the valve 202 to the first valve position. With the internal mechanism of the valve 202 in the first valve position, the gray water flowing into the first port 260 may exit the three port diverter valve 200 via the second port 265. This may have the effect of diverting the gray water to the recycling system drain pipe 310.

The removal of the electrical potential from the valve controller 205 when the wireless switch controller 210 is in the off state may cause the valve controller 205 to move the internal mechanism of the valve 202 to the second valve position. With the internal mechanism of the valve 202 in the second valve position, the gray water flowing into the first port 260 may exit the three port diverter valve 200 via the third port 270. This may have the effect of diverting the gray water to the sewer drain pipe 305.

In some embodiments, the wireless switch controller 210 may reverse a polarity of the electrical potential that is applied to the three port diverter valve 200. When the wireless switch controller 210 is in the on state the electrical potential applied to the valve controller 205 may be of a first polarity and may cause the valve controller 205 to move the internal mechanism of the valve 202 to the first valve position. With the internal mechanism of the valve 202 in the first valve position, the gray water flowing into the first port 260 may exit the three port diverter valve 200 via the second port 265.

When the wireless switch controller 210 is in the off state the electrical potential applied to the valve controller 205 may be of a second polarity and may cause the valve controller 205 to move the internal mechanism of the valve 202 to the second valve position. With the internal mechanism of the valve 202 in the second valve position, the gray water flowing into the first port 260 may exit the three port diverter valve 200 via the third port 270.

The first port 260 may couple to the gray water collection drain pipe 300. The gray water collection drain pipe 300 may be a drain pipe connecting one or more sources of gray water to the three port diverter valve 200. As non-limiting examples, the one or more sources of gray water may comprise a lavatory sink 910 and a shower stall 920. The gray water may pass through one or more traps before connecting to the gray water collection drain pipe 300. The one or more sources of gray water may be vented through the roof by one or more roof vents 935 on the gray water collection drain pipe 300 side of the one or more traps. As a non-limiting example, the gray water from the lavatory sink 910 may pass thought a lavatory sink trap 915 and the gray water from the shower stall 920 may pass through a shower stall trap 925 before reaching the gray water collection drain pipe 300.

The second port 265 may couple to the recycling system drain pipe 310. The recycling system drain pipe 310 may lead to water treatment equipment (not illustrated in the figures) and/or water storage equipment (not illustrated in the figures) and, eventually, to an irrigation system (not illustrated in the figures) or some other use for recycled water.

The third port 270 may couple to the sewer drain pipe 305. The sewer drain pipe 305 may carry the gray water to a municipal sewage system or a septic system. The sewer drain pipe 305 may comprise a backwater valve 320 to prevent sewage from reaching the three port diverter valve 200 and the drain pipes inside of the building where the invention 100 is installed.

The gray water collection drain pipe 300, the recycling system drain pipe 310, and/or the sewer drain pipe 305 may comprise one or more cleanouts 325 that provide access for removing obstructions from the pipes.

In use, the three port diverter valve 200 is installed in a drainage system a point where the gray water collection drain pipe 300, the recycling system drain pipe 310, and the sewer drain pipe 305 can be brought together. The wireless switch controller 210 may be mounted in or on a wall and wired to the valve controller 205. The application program may be installed on the smart device 900 and initialized to communicate with the wireless switch controller 210. The wireless switch controller 210 may be set, using either the wall switch 225 or the application program on the smart device 900, to move the internal mechanism of the valve 202 to the first valve position. In this position, the gray water from the one or more sources of gray water is directed from the gray water collection drain pipe 300 to the recycling system drain pipe 310 as the gray water passes through the three port diverter valve 200. This reduces the amount of water consumed because landscape irrigation can be performed using the recycled water and thereby reduces the consumption of incoming city water. This also reduces the strain on the municipal sewage system or the septic system, since less the gray water is directed in that direction. The internal mechanism of the valve 202 may be left in the first valve position for extended periods of time. If the demand for the recycled water drops, the wireless switch controller 210 may be used to move the internal mechanism of the valve 202 to the second valve position which routes the gray water from the gray water collection drain pipe 300 to the sewer drain pipe 305 as it passes through the three port diverter valve 200. As non-limiting examples, the demand for the recycled water may drop due to an extended period of rain, the water storage equipment becoming full, or for other reasons.

As used in this disclosure, an "application" or "app" is software that is specifically designed for use with a personal computing device.

As used herein, "backwater valve" refers to a valve in a drainage line that prevents water from flowing backwards through the drainage line.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, the term "form factor" refers to the size and shape of an object.

As used herein, "gray water" (also known as grey water or sullage) refers to wastewater from residential buildings or office buildings that does not contain fecal matter. As non-limiting examples, sources of gray water may include sinks, showers, bath tubs, dishwashing machines, and clothes washing machines, but specifically does not include toilets systems. Gray water is considered to be safer to handle and easier to treat than sewage and may be reused on site for watering landscapes, flushing toilets, and other non-potable uses.

As used in this disclosure, a "pipe" is a hollow cylindrical device that is used for transporting liquids and gases or for structural purposes. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

As used in this disclosure, a "sink" is a permanently installed water basin that is attached to one or more water sources.

As used herein, "smart device" refers to a portable electrical device comprising at least a processor, display, input device, and network connection. The input device is generally a touch screen, keyboard, or voice recognition. The network connection is generally wireless. Non-liming examples of smart devices may include smartphones, tablets, personal digital assistants, laptop computers, and smartwatches.

As used in this disclosure, a "solenoid" is a coil of electrical wire that generates a magnetic field and that can be used to mechanically move a shaft or armature.

As used in this disclosure, a "switch" is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

As used in this disclosure, a "transceiver" is a device that is used to transmit and/or receive signals. The signals may be audible, optical, or RF in nature.

As used in this disclosure, a "valve" is a device that is used to control the flow of a fluid (gas or liquid) through a pipe or to control the flow of a fluid into and out of a container. Some valves may have multiple ports and may allow the diverting or mixing of fluids.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 2, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. An automated gray water system comprising:
a three port diverter valve, a valve controller, and a wireless switch controller;
wherein the automated gray water system diverts gray water arriving via a gray water collection drain pipe into a recycling system drain pipe or into a sewer drain pipe;
wherein the diverter valve is controlled by a wall switch;
wherein the three port diverter valve comprises a first port, a second port, and a third port;
wherein an internal mechanism of the valve diverts the gray water from the first port to the second port when the internal mechanism of the valve is in a first valve position or from the first port to the third port when the internal mechanism of the valve is in a second valve position;
wherein the internal mechanism of the valve is repositioned by action of the valve controller;
wherein the valve controller is mounted onto the three port diverter valve such that an actuator of the valve controller is coupled to the internal mechanism of the valve;
wherein the valve controller utilizes an electromechanical device that changes position in response to the application of an electrical potential;
wherein the actuator moves in a linear or rotary manner when energized by the electrical potential;

wherein the linear or rotary motion changes the position of the internal mechanism of the valve to which the actuator is attached;

wherein the wireless switch controller is an electrical device that controls the application of the electrical potential to the valve controller;

wherein the wireless switch controller is electrically coupled to the valve controller via a switch wiring;

wherein the wireless switch controller has an on state and an off state;

wherein the wireless switch controller is provided at the wall switch;

wherein the wireless switch controller transitions between the on state and the off state based upon a physical movement of a switch handle;

wherein the wireless switch controller comprises a transceiver;

wherein the wireless switch controller communicates with an application program running on a smart device via the transceiver;

wherein the application program provides a user interface that is adapted to allow a user of the smart device to monitor and control the wireless switch controller;

wherein the wireless switch controller transitions between the on state and the off state based upon wireless messages exchanged via a wireless signal between the wireless switch controller and the smart device;

wherein the wireless switch controller passes the electrical potential when in the on state and blocks the flow of the electrical potential when in the off state;

wherein the application of the electrical potential to the valve controller when the wireless switch controller is in the on state causes the valve controller to move the internal mechanism of the valve to the first valve position;

wherein with the internal mechanism of the valve in the first valve position, the gray water flowing into the first port exits the three port diverter valve via the second port;

wherein when the gray water is diverted to the second port it is directed to the recycling system drain pipe;

wherein the removal of the electrical potential from the valve controller when the wireless switch controller is in the off state causes the valve controller to move the internal mechanism of the valve to the second valve position;

wherein with the internal mechanism of the valve in the second valve position, the gray water flowing into the first port exits the three port diverter valve via the third port;

wherein when the gray water is diverted to the third port it is directed to the sewer drain pipe;

wherein the first port couples to the gray water collection drain pipe;

wherein the gray water collection drain pipe is a drain pipe connecting one or more sources of gray water to the three port diverter valve;

wherein the gray water passes through one or more traps before connecting to the gray water collection drain pipe;

wherein the one or more sources of gray water are vented through a roof by one or more roof vents on the gray water collection drain pipe side of the one or more traps;

wherein the second port couples to the recycling system drain pipe;

wherein the recycling system drain pipe leads to water treatment equipment and/or water storage equipment;

wherein the third port couples to the sewer drain pipe;

wherein the sewer drain pipe carries the gray water to a municipal sewage system or a septic system;

wherein the sewer drain pipe comprises a backwater valve to prevent sewage from reaching the three port diverter valve and the drain pipes inside of a building where the automated gray water system is installed.

* * * * *